(12) United States Patent
Kim

(10) Patent No.: US 8,084,746 B2
(45) Date of Patent: Dec. 27, 2011

(54) RADIATION DETECTOR AND DETECTION METHOD HAVING REDUCED POLARIZATION

(75) Inventor: Hadong Kim, Methuen, MA (US)

(73) Assignee: Multi-Dimensional Imaging, Inc., Tustin, CA (US)

(*) Notice: Subject to any disclaimer, the term of this patent is extended or adjusted under 35 U.S.C. 154(b) by 842 days.

(21) Appl. No.: 11/996,007

(22) PCT Filed: Apr. 20, 2007

(86) PCT No.: PCT/US2007/067104
§ 371 (c)(1),
(2), (4) Date: Jan. 17, 2008

(87) PCT Pub. No.: WO2008/054860
PCT Pub. Date: May 8, 2008

(65) Prior Publication Data
US 2010/0116998 A1    May 13, 2010

Related U.S. Application Data

(60) Provisional application No. 60/745,230, filed on Apr. 20, 2006.

(51) Int. Cl.
*G01T 1/29* (2006.01)
(52) U.S. Cl. .................................................. 250/370.1
(58) Field of Classification Search ............... 250/370.1, 250/370.01, 370.09, 370.11, 370.12, 370.13; 378/53, 98.8, 98.9
See application file for complete search history.

(56) References Cited

U.S. PATENT DOCUMENTS

| | | | | |
|---|---|---|---|---|
| 5,051,801 A | * | 9/1991 | Van Eijk et al. | 257/465 |
| 6,028,313 A | | 2/2000 | McDaniel | |
| 7,127,027 B2 | | 10/2006 | Hoffman | |
| 7,145,986 B2 | * | 12/2006 | Wear et al. | 378/98.8 |

FOREIGN PATENT DOCUMENTS

| | | |
|---|---|---|
| EP | 0 383 389 | 8/1990 |
| EP | 1 643 272 | 4/2006 |

OTHER PUBLICATIONS

Speller et al., "Digital X-ray imaging using silicon microstrip detectors: a design study", Nuclear Instruments and Methods in Physics Research, 2001, pp. 653-664.
International Search Report and Written Opinion for International Application No. PCT/US2007/067104 dated Jul. 25, 2008.

* cited by examiner

*Primary Examiner* — David Porta
*Assistant Examiner* — Faye Boosalis
(74) *Attorney, Agent, or Firm* — Renner, Otto, Boisselle & Sklar, LLP

(57) ABSTRACT

A direct conversion radiation detector includes a detector body made from a direct conversion material, a plurality of segmented electrode members operatively coupled to a radiation-receiving side of the detector body and at least one electrode operatively coupled to a second side of the detector body. The radiation detector is configured such that received radiation is incident on the segmented electrode members. The radiation detector provides reduced polarization effects for a variety of high flux radiation detection applications.

19 Claims, 4 Drawing Sheets

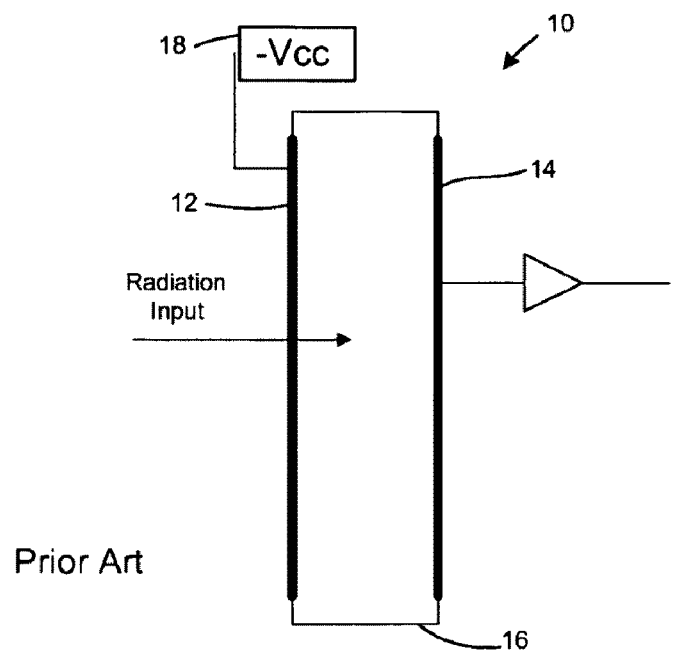
FIG. 1
Prior Art
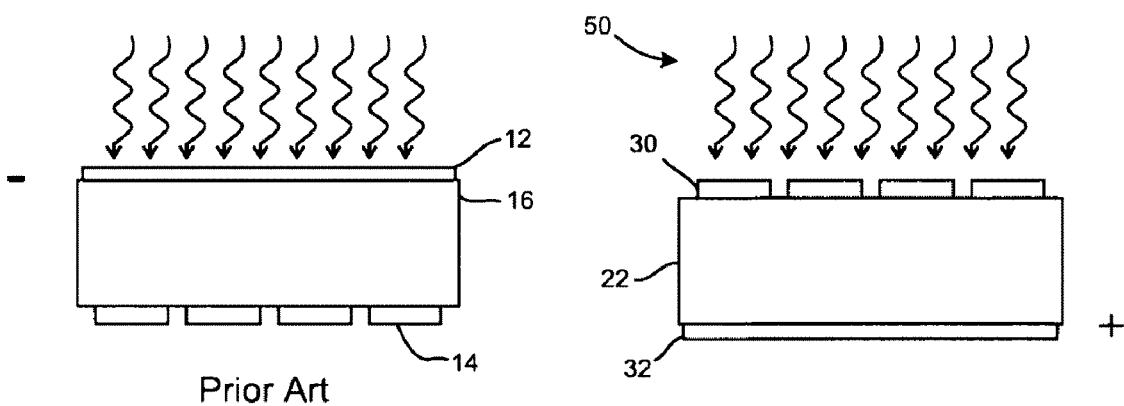
Prior Art
FIG. 4
FIG. 5

RADIATION DETECTOR AND DETECTION METHOD HAVING REDUCED POLARIZATION

This application is a national phase of International Application No. PCT/US07/67104 filed Apr. 20, 2007 and published in the English language.

RELATED APPLICATION DATA

This application claims priority of U.S. Provisional Application No. 60/745,230, filed on Apr. 20, 2006, which is incorporated herein by reference in its entirety.

STATEMENT REGARDING FEDERALLY SPONSORED RESEARCH

This invention was made with government support under Agreement Number MDA972-03-2-0001 awarded by the Defense Advanced Research Projects Agency (DARPA). The government may have certain rights in this invention.

FIELD OF THE INVENTION

The present invention relates generally to radiation detectors, such as high-energy X-ray and gamma ray detectors, and, more particularly, to a radiation detector and detection method having segmented electrodes.

BACKGROUND OF THE INVENTION

Radiation detectors, e.g., detectors capable of detecting X-rays and/or gamma rays, have been developed over the years for a variety of applications, e.g., medical imaging and detection, non-destructive testing and security inspection. Some early detectors included a collimator, a scintillation crystal and a plurality of photomultiplier tubes (PMTs). To overcome some shortcomings associated with PMT detectors, direct conversion detectors have been developed. Direct conversion detectors are capable of operating in photon counting mode or current mode.

Direct conversion radiation detectors, e.g., radiation detectors using Cadmium Zinc Telluride (CZT) or some other direct conversion material, have been developed over the years for a variety of applications. Nearly all of the research on CZT has been devoted to photon counting applications. Typically, these photon counting applications use gamma sources with flux rates that range from 1 photon per second up to $10^5$ photons per second. Some new photon counting applications are pushing the count rates over $10^6$ counts per second. These high flux rate applications may use Bremstrahlung sources, such as conventional X-ray tubes. These sources typically supply much higher fluence than gamma sources, even at their lowest range of operation, which is in the range of $10^6$ photons per second to up to $10^9$ photons per second. What's more is that X-ray tubes are polychromatic sources that output a wide spectrum of energies which has a significant effect on how these photons interact with the detection material.

Direct conversion radiation detectors traditionally have been plagued by polarization effects for high count rates in photon counting mode and non-linear response in current mode. The cause of the polarization may be the result of one of the carriers, either electron or hole, having a significantly lower mobility($\mu$)-lifetime($\tau$) product ($\mu\tau_e$—mu-tau electrons; $\mu\tau_h$—mu-tau holes) than the other carrier. In a conventional direct conversion detector, the hole $\mu\tau_h$ can be one to two orders of magnitude less that the electron $\mu\tau_e$.

For most conventional photon counting applications with moderate count rates, e.g., count rates of less than about $10^5$ photons per second, polarization effects have been reduced to insignificant levels due to the extensive research that has been put into improving device fabrication techniques and carrier transport properties in the materials. Electron mobility-lifetime products of CZT, for example, have improved over two orders of magnitude over the last ten years ($\mu\tau_e \approx 7\times10^{-3}$ cm$^2$/volt). The hole mobility-lifetime product has improved over the years but still remains one to two orders of magnitude lower than $\mu\tau_e$ ($\mu\tau_h \approx 2\times10^{-5}$ cm$^2$/volt).

Hole trapping was still an issue for all photon counting applications until the recent advent of detector designs which are relatively immune to the hole motion. A detailed discussion of the "Small Pixel Effect" can be found in H. Barrett, J. D. Eskin, and H. B. Barber, *Charge Transport in Arrays of Semiconductor Gamma-Ray Detectors*, Physical Review Letters, vol. 75(1), p. 156, 1995.

With reference to FIG. 1, initial direct conversion radiation detectors 10 were configured as single elements having metallic "planar" contacts 12, 14 coated on both sides of the detector body 16 as shown in FIG. 1. A potential 18 is applied across these two contacts 12, 14 to establish an electric field in the bulk of the detector. This field is employed to cause the carriers to drift to their respective electrode. The carrier motion in the insulating bulk material induces a charge that is sensed in one of the electrodes connected to a charge amplifier.

Investigators noticed that for photons that deposit energy throughout the detector thickness, there was a very significant low energy tail in the measured pulse height spectra. Theory and knowledge was developed that showed that hole trapping was the cause of the tail. A Typical value for mean drift length of electrons at 1000V/cm field strength is about 2 cm, whereas, the mean drift length for holes at the same field strength is about 0.02 cm. This means that as gamma or photons interact within the detector bulk and electron-hole pairs are generated, electrons are easily swept across the full bulk of moderately thick detectors. Holes, however, have little chance of making it to their respective contacts and are usually trapped in various trap centers. With the holes trapped, the signal strength becomes dependent on the distance the electrons travel to the positive contact. This results in a depth of penetration dependent signal strength rather than just an energy dependent signal strength, which compromises the energy resolution.

As crystal growth and fabrication techniques improved, large single crystal detectors became available. For applications requiring spatial information (e.g. imaging) it became necessary to "pixelate" the detector, which meant that one large crystal could be partitioned into many sensing elements by applying an array of metallic contacts on one side of the detector. Investigator quickly noticed that pixilated devices had much better energy resolution than non-pixelated device. This phenomenon was analyzed and a theory was developed by Barrett, et al. based on the "weighting potential" concept that explained the phenomenon. The theory describes how when a detector is pixelated, and the pixel dimension is significantly smaller than the detector thickness, most of the signal induction occurs when the electrons drift in the vicinity of the pixel where the weighting field is relatively strong. The summary result is that photons or gammas can interact over a large range of depth in the detector and produce signals that have a reduced dependence on depth compared with a planar device. When the electron-hole pairs are generated, the holes are quickly trapped, but the electrons do not induce much charge at the positive contact until they get within the high weighting field region near the pixel contact where they induce most of their charge on the electrode.

With this knowledge, radiation detectors were designed with optimized ratios of pixel dimension to detector thickness to achieve improved energy resolution operating in this mode. These conventional direct conversion detectors were configured with a continuous planar cathode through which incoming photons or gammas enter the detector with the charge sensing done on the pixelated contact side. All of these architectures are irradiated from the planar side of the detector with the charge or current sensing electronics connected to the pixelated backside of the devices.

This standard small pixel mode of operation works quite well as long as the transit time is relatively short with respect to the number of events occurring per unit time. At low to medium count rates, it is typically observed in present day CZT material, that consistent pulse heights are observed over long periods of time. If trapped charge were not de-trapping at least an equilibrium rate at which new carriers were being trapped, internal fields would build up due to the accumulated charge of the trapped carriers that would polarize the bulk material. In the past, this was indeed the case for poor quality materials.

At high count rates, it is often observed in conventional detectors that the pulse height decreases with time. This is a strong indicator that traps are filling faster that they are emptying and reverse polarization is occurring. The polarization effectively reduces the field strength across the device that decreases the charge collection efficiency. This changes the signal output from the expected value and causes a non-linear response of the detector.

At very high count rates or rather high fluence, as is typical of X-ray applications with X-ray tube sources, significant decreases in signal strength occur in short time frames indicating severe polarization.

SUMMARY OF THE INVENTION

The present invention provides a radiation detector having pixelated electrode members operatively coupled to the radiation-receiving face. The provision of a radiation-receiving face operatively coupled to a plurality of pixelated contacts facilitates radiation detection at higher doses with a reduction in polarization effects for high count rates in photon counting mode and/or a more linear response in current mode.

One aspect of the invention relates to a direct conversion radiation detector that includes a detector body comprised of a direct conversion material, the detector body having a radiation-receiving first surface and a second surface, a plurality of segmented electrode members operatively coupled to the radiation-receiving first surface, and a back electrode operatively coupled to the second surface.

Another aspect of the invention relates to a radiation detection method using a radiation detector having segmented electrode members operatively coupled to a first side of a direct conversion material body and a substantially continuous electrode operatively coupled to a second side of the direct conversion material body. The method includes positioning the direct conversion radiation detector with the segmented electrode members facing a source of radiation.

Another aspect of the invention relates to a direct conversion radiation detector that includes an absorption member comprised of a direction conversion material, the absorption member having a cathode surface and an anode surface, a segmented cathode operatively connected to the cathode surface, and an anode operatively coupled to the anode surface.

Another aspect of the invention relates to a direct conversion radiation detector that includes an absorption member comprised of a direction conversion material, the absorption member having a cathode surface and an anode surface, a plurality of cathode members operatively coupled to the cathode surface, where adjacent cathode members are separated by an electrode gap, and an anode member operatively coupled to the anode surface.

The foregoing and other features of the invention are hereinafter fully described and particularly pointed out in the claims, the following description and annexed drawings setting forth in detail a certain illustrative embodiment of the invention, this embodiment, being indicative, however, of but one of the various ways in which the principles of the invention may be employed.

BRIEF DESCRIPTION OF THE DRAWINGS

The forgoing and other features of the invention are hereinafter discussed with reference to the drawings.

FIG. 1 is a diagrammatic illustration of a conventional direct conversion radiation detector;

FIG. 4 is a diagrammatic illustration of a conventional direct conversion radiation detector;

FIG. 5 is a diagrammatic illustration of a direct conversion radiation detector in accordance with one aspect of the invention;

DETAILED DESCRIPTION

Figure 2:
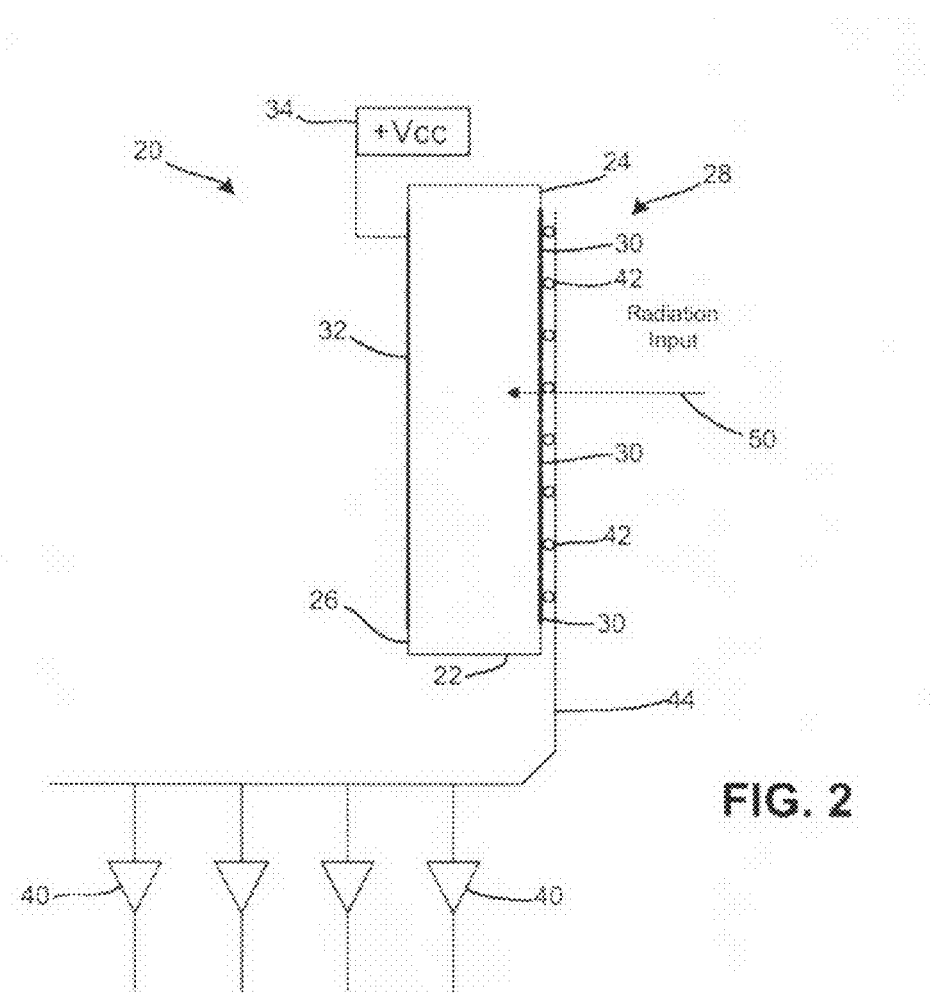
FIG. 2 is a diagrammatic illustration of a direct conversion radiation detector in accordance with one aspect of the invention.
Figure 3:
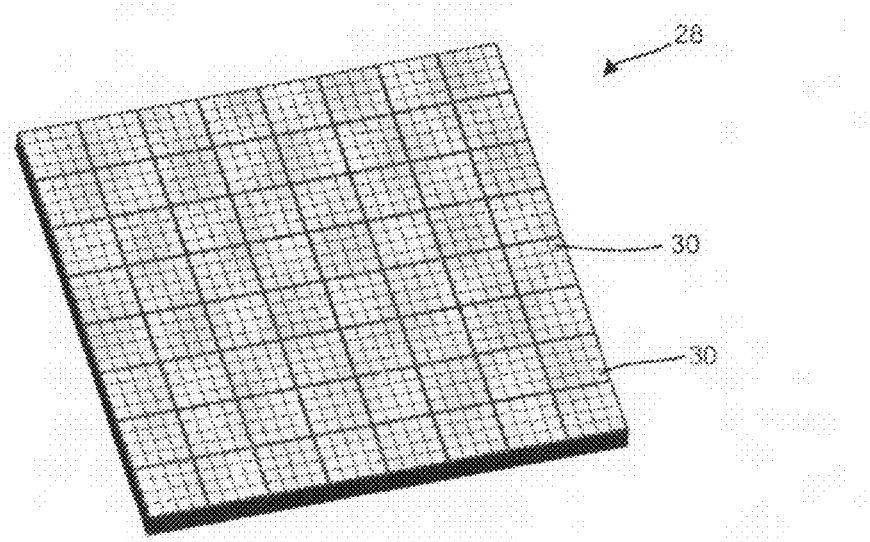
FIG. 3 is a perspective view of an exemplary pixelated cathode employed on the direct conversion radiation detector of FIG. 2.

In the detailed description that follows, like components have been given the same reference numerals regardless of whether they are shown in different embodiments of the present invention. To illustrate the present invention in a clear and concise manner, the drawing may not necessarily be to scale and certain features may be shown in somewhat schematic form.

The present disclosure includes a new direct conversion radiation detector and associated contact method that reduces or eliminates the polarization effects for high energy detector applications that require high count rate or high flux rates. A preferred configuration involves using direct conversion photoconductors in connection with pixelated contacts (also referred to as segmented contacts or segmented electrodes) on a radiation-receiving side and a planar contact on the opposite side. As opposed to the standard configuration of irradiating the planar contact side of the device for operation, the invention includes the provision of the detector being irradiated in the pixel contact side of the device. The detector is biased with the planar contact positive with respect to the pixel contacts. As is discussed below, the radiation detector may be employed in connection with any application that uses high energy detectors, including, but not limited to medical image detection, non-destructive testing, security inspection, etc.

Referring now to FIGS. 2-5, a radiation detector 20, e.g., a direct conversion radiation detector, is provided. The radiation detector 20 includes a detector body 22, which, in a preferred embodiment, is comprised of a direct conversion material. The detector body 22 (also referred to as an absorption member) includes a radiation-receiving first surface 24 (also referred to as a cathode surface, a radiation-receiving surface or a radiation-receiving face) and a second surface 26 (also referred to as an anode surface or a back surface) disposed on an opposite side of the detector body.

The detector body or absorption member 22 may be formed of an appropriate planar semiconductor material (e.g., CdTe or CdZnTe) having a first surface, e.g. a cathode surface, and an oppositely facing second surface, e.g., an anode surface. The dimension between the first surface and the second surface may be thought of as an absorption member thickness. When photons are directed at the cathode surface, the photons penetrate the absorption member and each photon is absorbed at an absorption depth within the member thickness. Photon absorption depths vary widely. When a photon interacts with the absorption member while being absorbed, the absorption member generates a plurality of electrons and holes.

The detector body may be comprised of any suitable direct conversion material, including, but not limited to, Cadmium Zinc Telluride (CZT), Cadmium Telluride (CdTe), Lead Iodide, Mercuric Iodide, Thallium Bromide or any other suitable direct conversion material. It will be appreciated that the detector body may be of any suitable shape, size, thickness or electrical characteristic. Further, the detector body may have a material composition and structure that includes dopants and/or impurities without departing from the scope of the present invention.

The radiation detector 20 includes a pixelated cathode 28, e.g., a plurality of pixelated electrode members 30 (also referred to as cathode electrodes, pixelated electrode members, pixelated contacts, pixelated cathode members or a pixelated cathode) operatively coupled to the radiation-receiving first surface 24. At least one planar electrode 32 (also referred to as an anode, an anode electrode, a planar contact, a back electrode or simply an electrode member) is operatively coupled to the second surface 26. Preferably, the radiation detector includes or otherwise is operatively coupled to a biasing mechanism 34, e.g., a suitable voltage source. As is discussed below, the radiation detector is configured such that the anode 32 is biased positive relative to the pixelated cathode 28.

When referring to contact structures, "planar" contacts refer to a metallic contact that covers a substantial portion of a detector body surface, e.g., the back surface 26, while "pixelated" or "segmented" contacts or electrodes refer to a device surface where the metallic contacts are deposited in the format of an array of contact surfaces with gaps or septa between the metallic contacts (shown, for example, in FIGS. 2 and 5). The pixel metallic contact defines the charge collection in the bulk below it in the detector device, essentially defining the pixel. The pixels can be created by various methods such as photolithography or by depositing a metal through a mask. Alternatively, pixelation can be achieved by physically segmenting a continuous contact by cutting for example. This invention is applicable to all types of materials or metals used for contacts such as gold, platinum, indium, etc.

It will be appreciated that the pixelated electrode members 30 may be made of any suitable electrically conductive material, including, but not limited to, gold, platinum, indium and the like. It will be appreciated that the pixelated electrode members may be formed by any suitable process, such as vapor deposition, screen printing or the like.

In a preferred embodiment, the pixelated electrode members 30 are operatively coupled to a plurality of amplifiers 40 such that each pixelated electrode member is operatively coupled to a separate amplifier. In one embodiment, electrical connection between the pixelated electrode members 30 of the pixelated cathode 28 and the corresponding amplifiers 40 is accomplished via printed wires and/or contacts (indicated generally with reference numeral 42), e.g., wires and/or contacts printed on a suitable circuitry support member 44, such as a printed circuit board (PCB).

As is illustrated schematically in FIG. 2 and FIG. 5, the provision of a pixelated cathode 28, including pixelated electrode members 30 operatively coupled to a radiation-receiving face 24 of the detector body 22 allows for positioning of the radiation detector such that radiation (depicted generally with reference numeral 50) is incident on the pixelated cathode 28. As is described more fully below, this configuration provides for a radiation detector having a more linear response (when operated in current mode) as well as reduced or eliminated polarization effects (when operated in photon counting mode).

An exemplary architecture according to this invention involves reversing the standard configuration and irradiating the pixelated electrodes of the detector instead of the planar back electrode of the detector. This mode of operation may be referred to as the "Pixel Irradiated Contact (PIC)" mode. Under these conditions, the bulk of the interactions occur within the weighting potential fields and the hole transport contributes significantly to the signal sensed at the pixelated electrodes. This method works best (but not limited to) when high $\mu\tau_h$ material is used. The embodiment shown utilizes a thin flexible printed circuit board to make the signal connection to the pixels. When the traces are kept to minimal thickness, there is minimal absorption loss due to the PCB. However, the invention is not limited to this connection scheme and applies to any method of establishing electrical connection to the pixels.

In the exemplary embodiment depicted in FIG. 2, the radiation input side 24 with the pixelated contacts 30 is held at virtual ground via the input trans-impedance of the charge amplifiers 40. The planar contact 32 on the other side of the device is brought to the appropriate positive bias potential depending on the application. The radiation detector may be operated with any pixel size or device thickness and is applicable to all geometries.

The provision of a direct conversion radiation detector being operated with the pixelated side of the device facing the radiation source is useful for reducing or eliminating polarization effects for high flux exposures with X-ray tube sources, however, it is not limited to such application and it can find application for any source or exposure level. It will be appreciated that the detector may be configured with any suitable pixel electrode configuration, including various guard rings or steering electrodes. In addition, radiation detector is applicable to any device structure that has an electrode where the weighting field is high. Coplanar grid, Frisch grid, 3-electrode and strip detectors are examples of such devices.

Various other deviations from this include guard rings around pixels as well as pixel groups. Other inter pixel steering electrodes also may be introduced between the pixels.

One standard configuration for a CdTe/CZT detector array is for X-rays to be incident on a negatively-biased continuous cathode (see, for example, FIG. 4). In this configuration, electrons drift toward the pixelated anode. For pulse height spectra this is the preferred orientation because electrons, which have much greater drift length (under a given electric field) than holes drift through the high weighting field region near the anode. The depth dependence of the signal is therefore minimized and consequently pulse height spectra are improved.

Figure 6B:
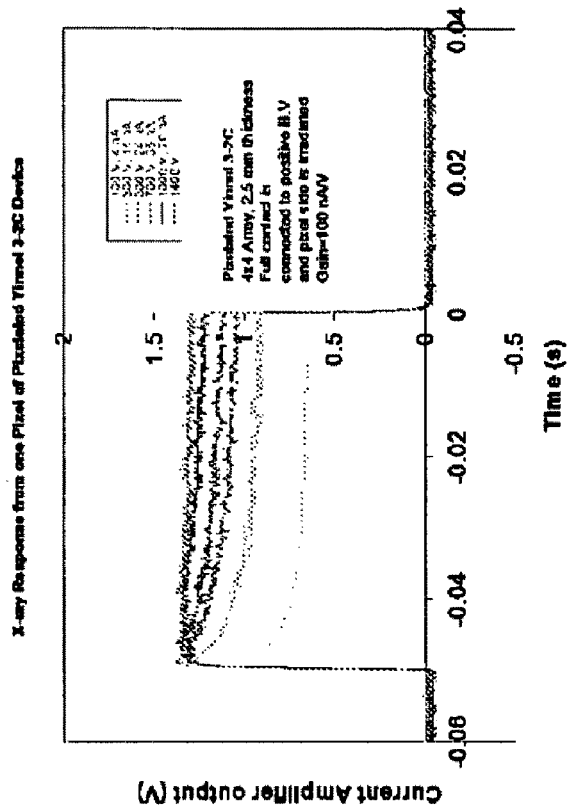
FIG. 6B is a plot of current amplifier output vs. time indicative of an x-ray response for an exemplary Cadmium Zinc Telluride (CZT) direct conversion radiation detector in accordance with the present invention.
Figure 6A:
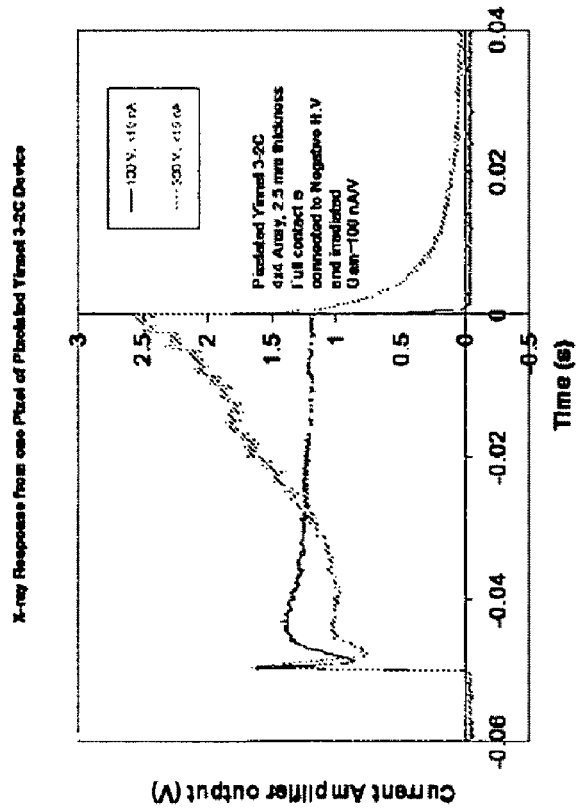
FIG. 6A is a plot of current amplifier output vs. time indicative of an x-ray response for an exemplary conventional Cadmium Zinc Telluride (CZT) direct conversion radiation detector.

For current mode operation, the X-ray induced photo-current more accurately follows the x-ray flux when the array is configured such that the X-rays are incident on the pixelated cathode 28 and the continuous planar contact 32 is biased positive with respect to the pixilated contact. FIGS. 4 and 5 schematically depict these two modes of detector operation. FIGS. 6A and 6B show typical detector response for each of the two modes. This behavior has been observed with devices fabricated from CZT from different sources and from CdTe (see, for example, FIGS. 7A and 7B).

FIGS. 6A and 6B illustrate x-ray response for exemplary CZT detectors operated in current mode in standard configuration (FIG. 6A) and novel configuration (FIG. 6B). The x-ray excitation was a rectangular "pulse" of 50 milliseconds duration. Ideally the x-ray response would be a rectangular pulse of 50 milliseconds duration. However, due in part to charge traps within the detector material, the detector response exhibits a non-linear response with respect to the x-ray flux.

Figure 7A:
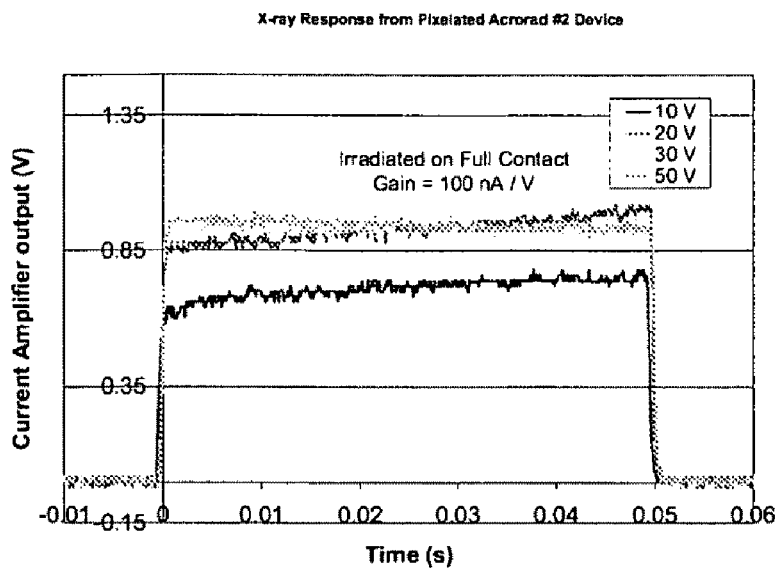
FIG. 7A is a plot of current amplifier output vs. time indicative of an x-ray response for an exemplary conventional Cadmium Telluride (CdTe) direct conversion radiation detector.
Figure 7B:
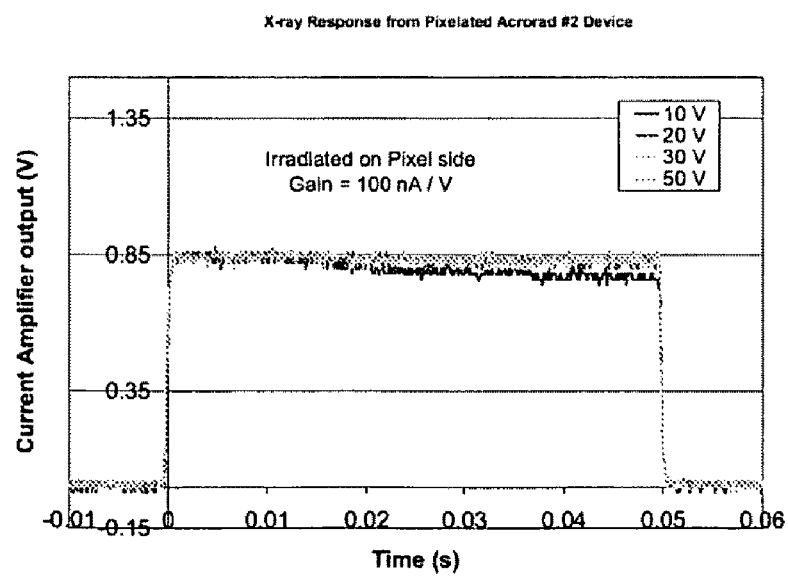
FIG. 7B is a plot of current amplifier output vs. time indicative of an x-ray response for an exemplary Cadmium Telluride (CdTe) direct conversion radiation detector in accordance with the present invention.

FIGS. 7A and 7B illustrate x-ray response for exemplary CdTe detectors operated in current mode in standard configuration (FIG. 7A) and novel configuration (FIG. 7B). The x-ray excitation was a rectangular "pulse" of 50 milliseconds duration. Ideally the x-ray response would be a rectangular pulse of 50 milliseconds duration. However, due in part to charge traps within the detector material, the detector response exhibits a non-linear response with respect to the x-ray flux.

Ideally, a detector operating in current mode will have an output current which is proportional to the incident x-ray flux. For this case, a rectangular pulse of X-rays will produce a rectangular current pulse in the detector. In reality, CZT detectors operated in current mode exhibit significant non-linear response to high flux X-ray pulses.

The radiation detector illustrated in FIG. 2 and FIG. 5 enables the reduction or elimination of the detrimental non-linear response of the detector that occurs at high fluence. It is also suitable for use with, but not limited to, radiation from X-ray tube sources that emit a Bremstrahlung radiation spectrum. One such application, but not limited to, is for X-Ray Computed Tomography (CT).

As described previously, at high fluence, de-trapping can no longer keep up with the rapid trap filling and a pile up of trapped charge develops. When operating detectors in the standard small pixel mode of operation with an X-ray tube source as shown in FIG. 2, a very large fraction of the absorption interaction takes place in the first 0.5 to 1 mm of the detector (for X-ray source tube voltage<150 kV). This causes a large number of interactions to occur in the first part of the detector and consequently a large amount of hole trapping in this region. All the trapped holes develop a positive space charge field, which is opposite to the applied electric field. As the trapping continues, the reverse polarization causes a reduction in the charge collection efficiency due to the reduced effective drift length of carriers.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A direct conversion radiation detector comprising:
   a detector body comprised of a direct conversion material, the detector body having a radiation-receiving first surface and a second surface;
   a plurality of segmented electrode members operatively coupled to the radiation-receiving first surface;
   a back electrode operatively coupled to the second surface; and
   a biasing mechanism comprising a voltage source operatively coupled to the back electrode,
   wherein the biasing mechanism is configured to bias the back electrode positive relative to the segmented electrode members.

2. The direct conversion radiation detector of claim 1, wherein the back electrode operatively coupled to the second surface is substantially continuous.

3. The direct conversion radiation detector of claim 1, wherein the back electrode operatively coupled to the second surface substantially covers the second surface.

4. The direct conversion radiation detector of claim 1, further comprising:
   a plurality of amplifiers operatively coupled to at least some of the segmented electrode members, the amplifiers generating position signals indicative of radiation received.

5. The direct conversion radiation detector of any of claim 4, wherein the amplifiers are operatively coupled to the segmented electrode members via conductive members disposed on a flexible circuitry support member.

6. The direct conversion radiation detector of claim 5, wherein the flexible circuitry support member is printed circuit board (PCB).

7. The direct conversion radiation detector of claim 5, wherein the flexible circuitry support member is positioned such that received radiation passes through the flexible circuitry support before reaching the detector body.

8. The direct conversion radiation detector of claim 1, wherein the detector body is comprised of Cadmium Zinc Telluride (CZT) or Cadmium Telluride (CdTe).

9. The direct conversion radiation detector of claim 1, wherein the detector body is comprised of Lead Iodide, Mercuric Iodide or Thallium Bromide.

10. The direct conversion radiation detector of claim 1, wherein the segmented electrode members are comprised of gold, platinum or indium.

11. A radiation detection method using a radiation detector having segmented electrode members operatively coupled to a first side of a direct conversion material body and a substantially continuous electrode operatively coupled to a second side of the direct conversion material body, the method comprising:
   positioning the direct conversion radiation detector with the segmented electrode members facing a source of radiation; and
   biasing the substantially continuous electrode positive relative to the segmented electrode members.

12. The radiation detection method of claim 11, further comprising:
   generating signals indicative of radiation received using a plurality of amplifiers operatively coupled to the segmented electrode members.

13. A direct conversion radiation detector comprising:
   an absorption member comprised of a direct conversion material, the absorption member having a cathode surface and an anode surface;
   a segmented cathode operatively connected to the cathode surface, wherein the cathode surface is a radiation-receiving surface; and
   an anode operatively coupled to the anode surface.

14. The direct conversion radiation detector of claim 13, wherein the segmented cathode comprises a plurality of metallic contacts with adjacent contacts being electrically separated.

15. The direct conversion radiation detector of claim 13, wherein the anode is biased positive relative to the segmented cathode.

16. The direct conversion radiation detector of claim 13, further comprising:
   a plurality of amplifiers operatively coupled to the segmented cathode via conductive members disposed on a circuit support member.

17. The direct conversion radiation detector of claim 16, wherein the circuitry support member is positioned such that received radiation passes through the circuitry support member before reaching the absorption member.

18. A direct conversion radiation detector comprising:
   an absorption member comprised of a direct conversion material, the absorption member having a cathode surface and an anode surface;
   the cathode surface being a radiation-receiving surface;
   a plurality of cathode members operatively coupled to the cathode surface, adjacent cathode members being separated by an electrode gap; and
   an anode member operatively coupled to the anode surface.

19. The direct conversion radiation detector of claim 18, wherein the anode member is biased positive relative to the cathode members.

* * * * *